United States Patent [19]

Nakakura et al.

[11] Patent Number: 4,885,176
[45] Date of Patent: Dec. 5, 1989

[54] METHOD OF MAKING BREAD

[75] Inventors: Hirofumi Nakakura, Osaka; Morio Shibata, Amagasaki; Haruo Ishikawa, Kawanishi; Akihisa Nakano; Hiromi Hirota, both of Osaka; Hajime Oyabu, Kawanishi, all of Japan

[73] Assignee: Matsushita Electric Industrial Co., Ltd., Japan

[21] Appl. No.: 64,253

[22] Filed: Jun. 19, 1987

[30] Foreign Application Priority Data

| Jun. 20, 1986 | [JP] | Japan | 61-145127 |
| Jun. 24, 1986 | [JP] | Japan | 61-147319 |
| Dec. 18, 1986 | [JP] | Japan | 61-305117 |
| Dec. 18, 1986 | [JP] | Japan | 61-300041 |
| Dec. 20, 1986 | [JP] | Japan | 61-300037 |
| Dec. 23, 1986 | [JP] | Japan | 61-305518 |
| Dec. 24, 1986 | [JP] | Japan | 61-306212 |
| Dec. 26, 1986 | [JP] | Japan | 61-315762 |
| Dec. 26, 1986 | [JP] | Japan | 61-315763 |
| Jan. 30, 1987 | [JP] | Japan | 62-20806 |

[51] Int. Cl.$^4$ .............................................. D21D 2/00
[52] U.S. Cl. ........................................ 426/19; 426/27
[58] Field of Search .................................... 426/19, 27

[56] References Cited

U.S. PATENT DOCUMENTS 3,944,678  3/1976  Pratolongo ........................ 426/508

FOREIGN PATENT DOCUMENTS

| 0131264 | 1/1985 | European Pat. Off. . |
| 0219077 | 4/1987 | European Pat. Off. . |
| 0031643 | 2/1985 | Japan | 426/27 |

*Primary Examiner*—Donald E. Czaja
*Assistant Examiner*—Helen Pratt
*Attorney, Agent, or Firm*—Lowe, Price, LeBlanc, Becker & Shur

[57] ABSTRACT

Bread ingredients and water are kneaded at the start of a bread making process, and the dough is rested. Subsequently, dry yeast is added to the dough, and the dough with the added dry yeast is kneaded again. The dough is then allowed to ferment during which time a gas is released from the dough several times, the fermentation stage being followed by baking the dough. An automatic bread making apparatus has a yeast charger for charging dry yeast into a kneading container. Thus, dry yeast can automatically be added to the kneaded dough without manual intervention.

7 Claims, 7 Drawing Sheets

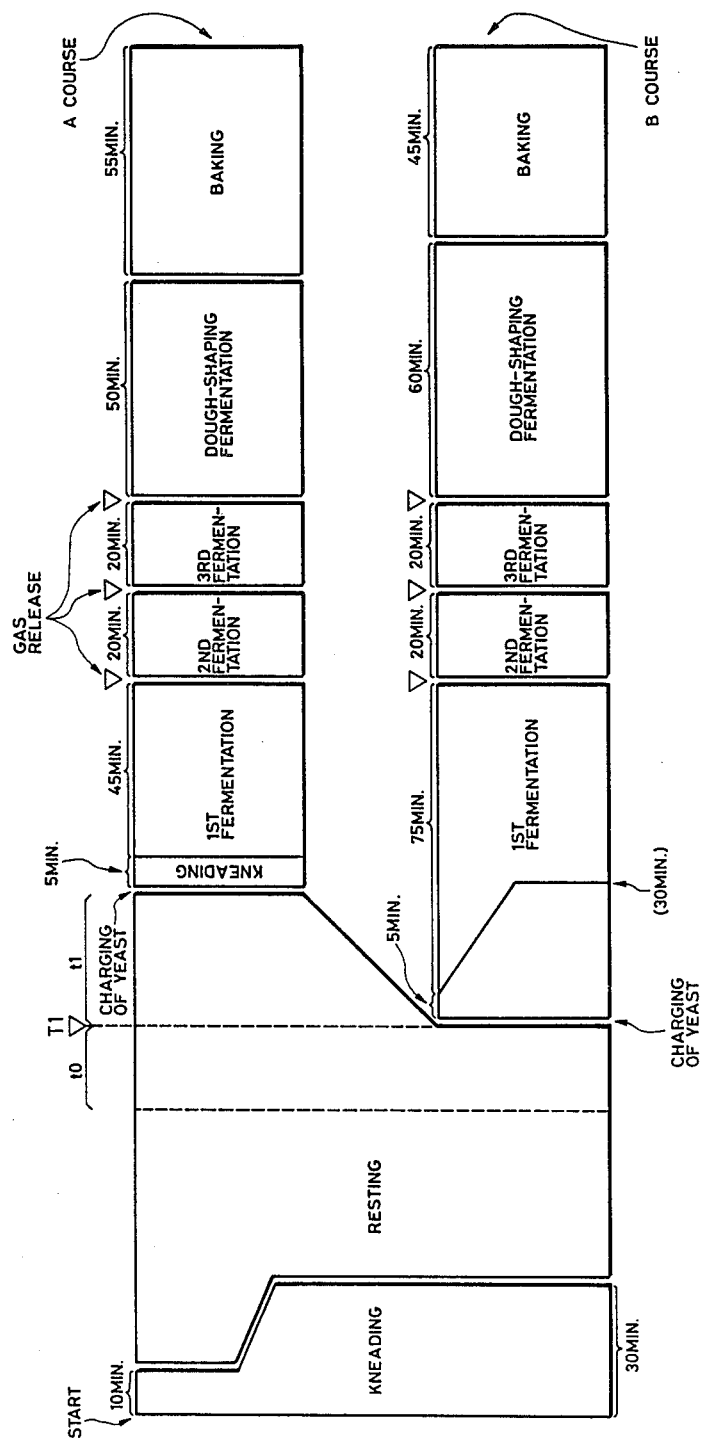

METHOD OF MAKING BREAD

BACKGROUND OF THE INVENTION

The present invention relates to a method of and an apparatus for making bread at home by manually setting necessary ingredients such as wheat flour, water, yeast, and other materials and automatically kneading, fermenting, releasing gas from, and baking a dough, so that a loaf of bread as it is just baked can be produced at home.

Generally known methods of making breads include the straight dough method, the sponge-dough method and the soaker process. According to the straight dough method, all the necessary ingredients for making bread, i.e., wheat flour, sugar, salt, skimmed milk, butter, yeast, and water are mixed together into a dough, which is then kneaded, fermented, allowed to release gas, and finally baked. Since the straight dough method is simplest, it is most widely relied upon for making bread in kitchens. The sponge-dough method comprises the steps of mixing part of the dough ingredients, i.e., a substantial portion of wheat flour, yeast, and water, into a sponge, which is then allowed to ferment preliminarily, and then mixing the sponge and the remaining ingredients into a dough, which is fermented and baked. According to the soaker process, all the ingredients but yeast are mixed together, and, after a certain period of time, compressed yeast or dry yeast which has been preliminarily fermented in lukewarm water with a small amount of sugar is also added. The dough is then fermented, allowed to release gas, and finally baked.

Efforts have been made to produce automatic bread making machines for home use. However, various problems have been encountered in designing such automatic bread making machines.

More specifically, since all of the bread ingredients are put into a container and mixed together at the outset in the straight dough method, the yeast absorbs the water and gets activated. If the dough were left as it is for a long period of time, it would be excessively fermented, and the produced bread would be of reduced quality.

Problems of the sponge-dough method are as follows: A space is required for storing the remaining ingredients to be added later. A substantial portion of wheat flour, yeast, and water are first mixed, kneaded, and fermented preliminarily, as described above. Therefore, if the time for baking up the dough were delayed, the dough would be allowed to ferment over a prolonged period of time and hence would be overly fermented. As a result, this method fails to bake bread of good quality at a desired time.

The soaker process is disadvantageous for the following reasons: Since compressed yeast is less available than other yeasts, it is customary to use dry yeast. The dry yeast needs to be subjected to preliminary fermentation with lukewarm water containing a small amount of sugar. Consequently, the dry yeast and the lukewarm water have to be stored separately before the preliminary fermentation. The lukewarm water should be kept at a desired temperature, and attention should be paid to the manner in which the preliminarily fermented dry yeast is charged because it is viscous.

As stated above, the conventional methods of making bread pose various problems in the manufacture and operation of automatic home-use bread making machines.

One conventional automatic bread making machine which has been proposed is illustrated in FIG. 9 of the accompanying drawings. In FIG. 9, the bread making machine includes a casing 1, a chassis 2 disposed in the casing 1, a motor 3, a heater 4, and a baking chamber 6 with its outer periphery covered with a thermal insulation 5, the motor 3, the heater 4, and the baking chamber 6 being fixed to the chassis 2. A kneading container 8 having a kneading blade 7 is detachably mounted in the baking chamber 6, the kneading blade 7 being rotated at a reduced speed by the motor 3 through a belt 9 and pulleys 10, 11 which double as a speed reducer. Above the baking chamber 6, there is disposed an openable hinged lid 13 having an inner lid 12. A water supply unit 14 supplies water into the kneading container 8. The bread making machine also has a temperature sensor (not shown) for detecting the temperature of the kneading container 8, a control unit 15 for controlling the motor 3, the heater 4, the water supply unit 14, and the like, and an input unit (not shown) for setting control conditions for the control unit 15. In operation, all dough ingredients other than water are charged into the kneading container 8, and a desired baking time and other data are entered through the input unit. The water supply unit 14 and the motor 3 starts operating at a prescribed time, and the mixed ingredients are kneaded while detecting the temperature of the kneading container 8. When a prescribed temperature or time period has been reached, the motor 3 is de-energized, and the operation enters a fermentation process. The fermentation process progresses while temperature control is effected by the heater 4 dependent on the temperature of the kneading container 8 and gas is released from the dough several times by rotation of the motor 3. Upon elapse of a prescribed period of time, the heater 4 is energized to bake the dough, which is baked up into bread at a desired time.

In the conventional automatic breading making machine, the ingredients are left as they are in the kneading container 8 after the bread making machine is started and until a time is reached for starting an actual bread making process, in order that bread will be baked up at a desired time. No problem arises when a bread making process is started immediately after the ingredients have been set in the kneading container. However, if the dough ingredients are set in the kneading container 8 at night and are to be baked in the next morning, water would start fermenting yeast before the ingredients are kneaded, thus failing to make bread. To avoid this problem, water is separately stored, and will be supplied from the water supply unit 14 at the time the ingredients start being kneaded. Therefore, the water supply unit 14 comprising a large water tank and a pump mechanism is indispensable, with the result that the bread making machine is large in size. Where water is stored for a long period of time, its temperature is increased particularly when it is hot during summer, for example. Therefore, the temperature of the dough will also be high causing the yeast to be too activated to make good bread. When it is cold during winter, stored water is of lowered temperature. If cold water were brought into touch with the yeast at the time of supplying the water, the yeast would be killed, also failing to make good bread. If atmospheric temperature were much lower, stored water would be frozen and no bread could be made at all. In order to prevent water temperature from dropping, it has been prior practice to employ a thermally insulated water tank or cool stored water with ice. Where the ingredients including yeast start to be kneaded while water is being supplied, the dough simultaneously begins to ferment, and at the same time the temperature of the dough rises due to the kneading process. Therefore, unless the kneading time interval were varied dependent on the temperature of the dough at the time of starting kneading the dough, the temperature of the dough would become too high or low, and no desirable bread would be produced. Conversely, if the kneading time period were controlled so that the dough would be of an optimum temperature, the time period in which to allow the dough to ferment would be varied, thereby causing the dough to excessively or insufficiently be fermented. Therefore, bread could not stably be made. Moreover, the dough may insufficiently or excessively be kneaded dependent on the temperature of the dough at the time of starting to knead the dough. This also fails to make desirable bread.

SUMMARY OF THE INVENTION

According to the present invention, there is provided a method of making bread, comprising the steps of kneading bread ingredients and water into a dough, adding dry yeast to the dough, kneading the dough and the dry yeast, fermenting the dough, releasing a gas from the dough while the dough is being fermented, and baking the dough after the dough has been fermented.

With the above method, as described above, bread ingredients and water are kneaded when starting a bread making process, then dry yeast is added, and the dough with the added dry yeast is kneaded again. Therefore, cold ingredients and water can sufficiently be kneaded even during summer, and can uniformly be kneaded without forming solid ingredient masses in the dough. As a result, produced bread is of good quality as it is of a fine grain, is white inside, and soft in texture. Since the bread ingredients and water are kneaded when the bread making process begins, a water supply unit composed of a water tank and a pump mechanism, which has heretofore been required, is no longer necessary. Consequently, an automatic bread making apparatus for carrying out the method of the invention is compact and simple in structure.

The bread making apparatus has a yeast charger for charging dry yeast into a kneading container. Thus, dry yeast can automatically be added to the dough kneaded in the first kneading step without involving manual operation of the user.

Therefore, it is an object of the present invention to provide a method of and an apparatus for automatically making bread of good quality.

Another object of the present invention is to provide an automatic bread making apparatus which is compact and simple in structure.

BRIEF DESCRIPTION OF THE DRAWINGS

The present invention will be described in detail by way of illustrative example with reference to the accompanying drawings, in which;

FIG. 6 is a diagram of a bread making method according to the present invention;

DETAILED DESCRIPTION

Figure 1:
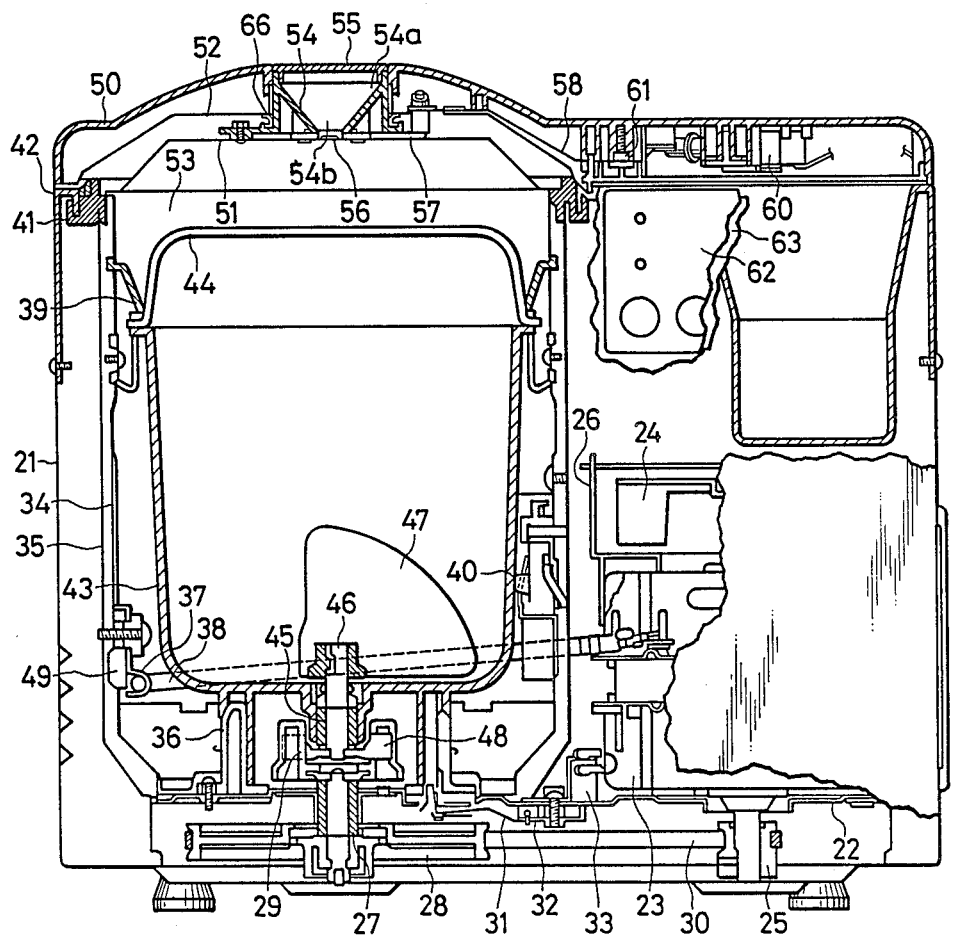
FIG. 1 is a vertical cross-sectional view of an automatic bread making apparatus according to the present invention.

FIG. 1 shows in vertical cross section an automatic bread making apparatus according to the present invention. The automatic bread making machine includes a housing 21, a chassis 22 disposed in the housing 21, and a motor 23 fixedly mounted on the chassis 22. The motor 23 has a shaft having one end to which a motor cooling fan 24 is secured and the opposite end to which a smaller-diameter pulley 25 is affixed. A fan guide 26 is fixed to the motor 23 around the motor cooling fan 24 for increased motor cooling efficiency. A larger-diameter pulley 28 has a shaft rotatably supported in a bearing 28 mounted on the chassis 22. A connector 29 is attached to the upper end of the shaft of the larger-diameter pulley 28. An endless belt 30 is trained around the larger- and smaller-diameter pulleys 28, 25. Therefore, the connector 29 is rotated when the motor 23 is energized.

A switch lever 31 is angularly movably supported on a shaft 32 supported on the chassis 22. A switch 33 is mounted on the chassis 22 above one end of the switch lever 31. To the chassis 22, there are fixed a baking container 34, a thermally insulating plate 35 surrounding the baking container 34, and a cylindrical guide 36 positioned at the bottom of the baking container 34 and surrounding the connector 29. A heater 38 is fixed to the inner wall surface of the baking container 34 by means of a clamp 37 through an insulator 49. A container fixing spring 39 and a resiliently supported temperature sensor 40 are also fixed to the baking container 34. The baking container 34 has its upper open end fixed to an upper frame 42 by means of a fixture 41. The housing 21 is secured to the upper frame 42 as well as the chassis 22.

A kneading container 43 is detachably mounted in the baking container 34 and has a grip handle 44 attached to its upper end. A kneading fin or blade 47 disposed in the kneading container 43 is detachably mounted on a blade shaft 46 rotatably supported in a bearing 45 mounted on the kneading container 43. A container connector 48 is fixed to the lower end of the blade shaft 46 and coupled to the connector 29. Thus, rotation of the connector 29 is transmitted through the container connector 48 to the kneading blade 47. When the kneading container 43 is mounted in the baking container 34, the kneading container 43 is fitted in the cylindrical guide 36 and the container fixing spring 39, with the temperature sensor 40 pressed against the outer surface of the kneading container 43.

Figure 2:
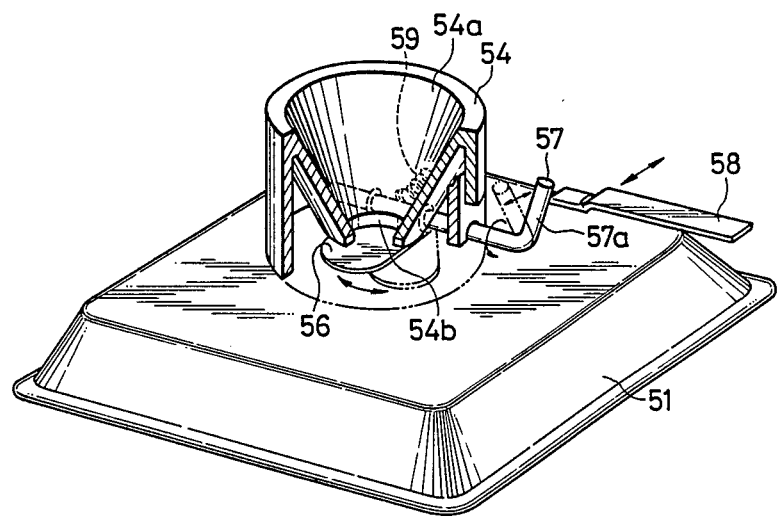
FIG. 2 is a perspective view, partly cut away, of a yeast container in the automatic bread making apparatus.

An openable lid assembly 50 includes a lid cover 52 having an inner lid 51 positioned above the baking container 34. With the lid assembly 50 closed, the inner lid 51 and the baking container 34 jointly define a baking chamber 53. A yeast container 54 of an inverted conical shape is mounted on the inner lid 51 and has an upper opening 54a opening at the upper surface of the lid assembly 50. A lid 55 is detachably fitted in the upper opening 54a. As shown in FIG. 2, the yeast container 54 has a lower opening 54b for dropping yeast therethrough and includes a closure plate 56 which openably closes the lower opening 54b. The closure plate 56 is integral with a rotatable shaft 57 supported between the yeast container 54 and the inner lid 51. The shaft 57 has one end bent 57a into an L shape held in abutment against an actuator bar 58 rotatably supported on a shaft 61 mounted in the lid assembly 50. The closure plate 59 is normally urged in a direction to close the lower opening 54b by means of a spring 59. When a drive unit 60 in the lid assembly 50 is energized, the actuator bar 58 coupled to the drive unit 50 is swung to turn the bent end 57a of the shaft 57 to angularly displace the closure plate 59 against the bias of the spring 59 for thereby opening the lower opening 54b. Denoted in FIG. 1 at 62 is a switch panel for entering input data such as a time for finishing bread, and 63 a control unit for determining and issuing control conditions for the motor 23 and the heater 38 based on input information from the switch panel 62 and the temperature sensor 49.

Operation of the bread making apparatus will be described below. The kneading blade 47 is mounted in the kneading container 43, and bread ingredients such as wheat flour, water, and other materials, except yeast, are put into the kneading container 43. The kneading container 43 is then set into the baking container 34, and the lid assembly 50 is closed. At this time, a prescribed amount of yeast is placed in the yeast container 54. A desired time for baking up bread is entered through the switch panel 62, and the bread making apparatus is set for operation. When a time to start an actual breading making process is reached, the motor 23 is energized to rotate the smaller-diameter pulley 25 to cause the belt 30 to rotate the larger-diameter pulley 28 and the connector 29. The rotation of the connector 29 is directly transmitted to the container connector 48 to rotate the kneading blade 47 to knead the bread ingredients into a dough. Upon elapse of a prescribed period of time, the drive unit 60 is energized to turn the actuator bar 58, which then turns the shaft 57 to open the closure plate 56 for thereby charging the yeast from the yeast container 54 into the kneading container 43. The charged yeast is kneaded with the dough for a given interval of time. Thereafter, under process control effected by the control unit 63, temperature information is applied from the temperature sensor 49 to the control unit 63 which adjusts the temperature of the kneading container 43 with the heater 38 while automatically effects a first fermentation step, a gas releasing step, a second fermentation step, a gas releasing step, a third fermentation step, a gas releasing step, a gas releasing step, a dough-shaping fermentation step, and a baking step successively, after which bread will be baked up at a preset time.

Figure 3:
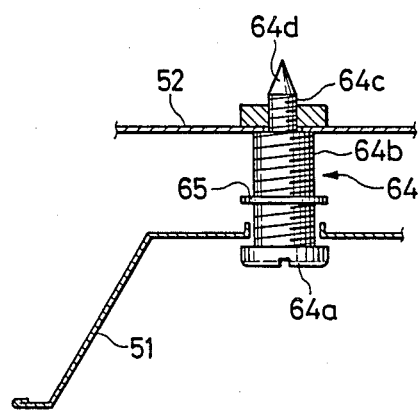
FIG. 3 is an enlarged fragmentary cross-sectional view showing a structure by which an inner lid is attached to a lid assembly in the automatic bread making apparatus.

As shown in FIG. 3, the inner lid 51 is attached to the lid cover 52 by an attachment screw 64 having a head 64a, a cylindrical shank 64b having one end joined to the head 64a and an annular flange stopper 65 on its intermediate portion, a threaded member 64c on the other end of the shank 64b, and a conical tip 64d on the end of the threaded member 64c. The inner lid 51 is slidably guided over the cylindrical shank 64b between the head 64a and the stopper 65. Even when the attachment screw 64 is detached from the lid cover 52 in order to remove the inner lid 51 from the lid cover 52, the attachment screw 64 remains attached to the inner lid 51 by the stopper 65. As shown in FIG. 1, the inner lid 51 and the lid cover 52 are held against each other through a resilient body 66 which normally urges the inner lid 51 resiliently in a downward direction.

Figure 4A:
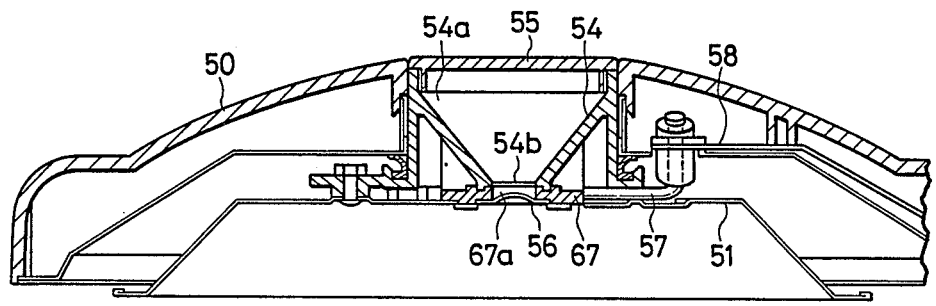
FIG. 4(a) is an enlarged fragmentary cross-sectional view of the yeast container on the lid assembly.
Figure 4B:
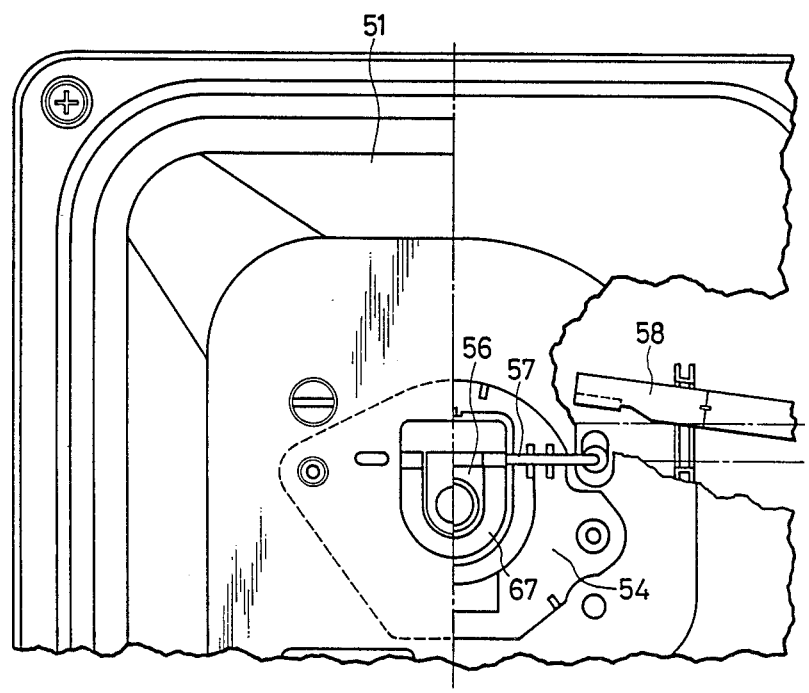
FIG. 4(b) is an enlarged fragmentary plan view of the yeast container on the lid assembly.

As illustrated in FIGS. 4(a) and 4(b), a nonsticky member 67 made of a non-sticky material is interposed between the lower opening 54b and the inner lid 51 and fixed so that it is exposed into the kneading container 43 below the inner lid 51. The non-sticky member 67 has a yeast charging port 67a communicating with the lower opening 54b of the yeast container 54. The closure plate 56 with its surface covered with a non-sticky material is disposed in a manner to normally close the yeast charging port 67a. The lower surface of the inner lid 51 is also covered with a non-sticky material.

The upper opening 54a of the yeast container 54 has a larger area than that of the lower opening 54b thereof. The yeast container 54 has a smooth inner conical surface extending from the upper opening 54a toward the lower opening 54b for allowing stored yeast to drop smoothly and reliably into the kneading container 43.

Figure 5A:
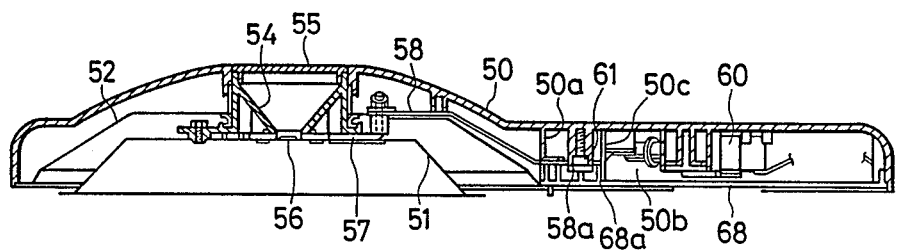
FIG. 5(a) is an enlarged fragmentary cross-sectional view of the lid assembly.
Figure 5B:
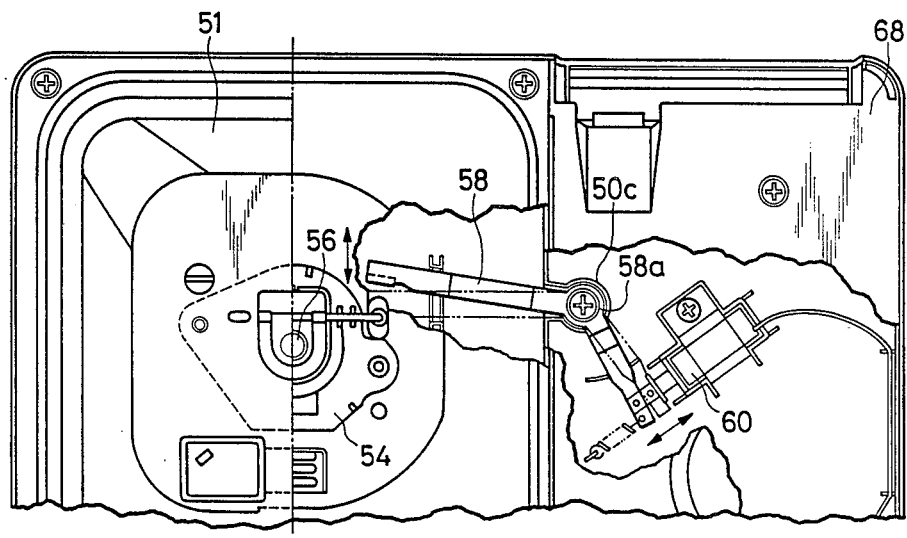
FIG. 5(b) is an enlarged fragmentary plan view of the lid assembly.

As illustrated in FIGS. 5(a) and 5(b), the drive unit 60 and the actuator bar 58 with its one end rotatably supported on the shaft 61 for actuating the closure plate 56 are disposed in the lid assembly 50 positioned above the baking container 34. In the lid assembly, there are mounted the yeast container lid 55 and the yeast container 54 with the shaft 57 to which the closure plate 56 is fixed. The lid assembly 50 further includes an integral partition 50a separating the yeast charger including the yeast container 54 and its neighboring members and the drive unit 60. The partition 50a and a lower lid cover 68 of the lid assembly 50 jointly define an isolated chamber 50b in which the drive unit 60 is located. The actuator bar 58 has a substantially circular pivoted portion 58a with its outer periphery fitted substantially hermetically in a cylindrical boss 50a contiguous to the partition 50a integral with the lid assembly 50 and a cylindrical boss 58a on the lower lid cover 68 covering the drive unit 60 from below.

The closure plate 56 is controlled so that it is opened and closed twice or a larger number of times.

A method of making bread according to the present invention will be described with reference to the process diagram of FIG. 6. First, bread ingredients are charged into the kneading container 43 in the following proportions: 300 g of wheat flour, 6 g of skimmed milk, 15 g of sugar, 6 g of salt, 9 g of butter, and 210 g of water. The ingredients may however be charged in various other proportions.

Then, the kneading container 43 is set in the baking container 34, and 3 g of dry yeast is put in the yeast container 54. The yeast container lid 55 is closed and so is the lid assembly 50. The power supply of the bread making apparatus is switched on, and a desired bread baking-up time is entered through the switch panel 62. The bread making apparatus is now set for automatic operation. As shown in the process diagram of FIG. 6, the motor 23 is first energized to rotate the kneading blade 47 to knead the charged ingredients into a dough. By using cooled ingredients and water during summer, the dough will not become poor in nature due to an excessive rise in the dough temperature, and hence the dough can well be kneaded until its temperature reaches 28° C. In this example, the dough is kneaded until its temperature reaches 28° C. The kneading time may be set to 10 minutes at minimum and 30 minutes at maximum. Then, the bread dough enters a resting stage in which gluten is formed in the dough. At an optimum time which is counted back from the bread baking-up time that has been entered at the outset, the closure plate 56 of the yeast charger is opened to allow the stored yeast to be added from the yeast container 54 to the dough in the kneading container 43. At the same time, the motor 23 is rotated again to knead the dough in order to well disperse the yeast into the dough. The time period for this re-kneading of the dough at a second kneading stage may be 5 minutes when the ambient temperature is high, or 30 minutes at maximum when the ambient temperature is low.

Then, the dough enters a first fermentation stage in which the temperature of the dough in the kneading container 43 is detected by the temperature sensor 49, and the control unit 63 controls the heater 38 so that the dough temperature becomes optimum. Thereafter, the kneading blade 47 is rotated to release a gas of $CO_2$ generated in the dough, followed successively by a second fermentation stage, a gas releasing stage, a third fermentation stage, a gas releasing stage, and a dough-shaping fermentation stage.

After the above stages have been completed, the heater 58 is energized to bake the dough. During the baking step, the heater 38 is controlled by the temperature sensor 59 and the control unit 63 so that the baked bread will have an optimumly colored crust.

The control unit 63 is programmed to effect the following control modes. In FIG. 6, the dough temperature is detected at a time T1. If the detected dough temperature is below a preset temperature, then the yeast is charged at this time, and the second kneading stage is started for making bread in a B course. If the detected dough temperature is higher than a preset temperature at the time T1, then the charging of the yeast is delayed for a time t1 in order to follow a A course for the making of bread. The dough temperature is also detected at a time which is t0 ahead of the time T1, and if the detected dough temperature is lower than a preset temperature, then the dough is heated up to the preset temperature.

Figure 7:
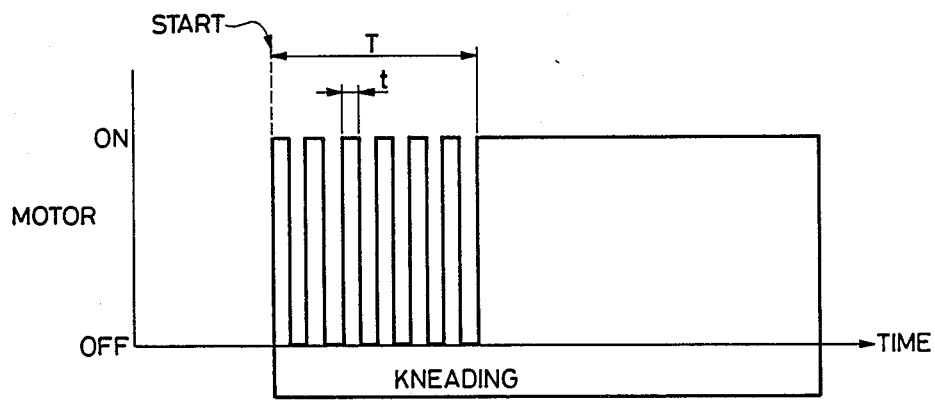
FIG. 7 is a diagram showing a first kneading step of the bread making method.

As illustrated in FIG. 7, during a certain time period T from the start of the first kneading stage, the kneading blade 47 is intermittently rotated in repeated cycles each for a time t in which the kneading blade 47 makes several revolutions. Upon elapse of the time period T, the kneading blade 47 is continuously rotated. The bread making method of the present invention is based on the soaker process and uses granular dry yeast which does not require preliminary fermentation. Therefore, the space needed for storing the yeast is small. In order to carry out the bread making method of the invention, which is an improved soaker process, it is necessary to quickly add an knead dry yeast with the bread dough after the first kneading step. To meet this requirement, the proportion of water to the other dough ingredients is selected to be about 75 wt. %, which is higher than the normal proportion.

The dough is allowed to rest between the first kneading stage and the step of adding dry yeast to the dough. This dough resting stage assists in forming gluten in the dough, and can adjust the process time dependent on the dough temperature without adversely affecting the making of bread.

As described above, during the dough resting period between the first kneading stage and the yeast charging step and a prescribed period of time before the yeast is charged, if the dough temperature is lower than a preset temperature, then the dough is heated up to the preset temperature. Therefore, the dough can be well kneaded in the second kneading stage without paying attention to yeast activation in both summer and winter. As a result, the second kneading time period after the yeast has been charged is reduced. The dough temperature can be low during summer, and can be controlled prior to the second kneading stage during winter. Accordingly, the dough can optimumly be kneaded even in a short period of time, so that a constant kneading time and temperature can be maintained. Moreover, the temperature control allows constant time and temperature control in the subsequent process, with the result that baked bread will be of good quality throughout the seasons of the year.

During the first kneading stage, the kneading blade 47 is intermittently rotated in an initial period and then continuously rotated in a subsequent period. Thus, the powdery ingredients placed in the kneading container 43 and masses of wheat flour are prevented from being scattered around in the initial period of the kneading process, but are allowed to gradually mix with water to form a somewhat stiff dough. After the dough has been formed, the kneading blade 47 is continuously rotated, but no materials are scattered out of the kneading container 43 and hence the baking container 34 is not smeared. This intermediate-and-then-continuous rotation mode does not vary the kneading performance, but still allows good bread to be made. The fermentation process has a plurality of gas releasing steps for sufficiently releasing a gas of $CO_2$ generated in the dough and for uniformizing a gas distribution in the dough, resulting in permitting bread of good quality to be baked.

If the dough temperature detected after the first kneading stage is higher than a preset temperature, then the time of charging dry yeast is delayed from the charging time which is the case if the dough temperature is lower than the preset temperature. This can prevent the dough from being overly fermented at high ambient temperature during summer. As a consequence, relatively uniform bread of good quality can be baked throughout the year without being largely affected by varying ambient temperatures.

The proportion of water to the other bread ingredients during the first kneading step is about 75% which is higher than the normal proportion of water, so that charged dry yeast can easily be mixed into and kneaded with the dough in the second kneading stage.

In the arrangement of the bread making apparatus of the invention, the yeast container 54 with the upper and lower openings 54a, 54b is mounted in the lid assembly 50 positioned above the kneading container 43 placed in the baking container 34, with the upper opening 54a opening at the upper surface of the lid assembly 50. The lower opening 54b is openable and closable by the closure plate 56 movable by the drive unit 60. Dry yeast can be placed into the yeast container 54 when the lid assembly 50 is closed. When the stored dry yeast is to be charged, the drive unit 60 is operated to open the closure plate 56 to allow the stored dry yeast to drop into the kneading container 43. Therefore, bread ingredients other than dry yeast are first charged and kneaded in a first kneading stage, and then dry yeast is added to the dough which is then kneaded in a second kneading stage. As a result, any water supply unit including a water tank and a pump mechanism are not necessary and no water tank insulation is required. Since yeast can be placed into the yeast container 54 simply by opening the yeast container lid 55 without opening the lid assembly 50, it is quite easy to put yeast into the yeast container 54. The entire bread making apparatus is small in size. Inasmuch as the dough with yeast not yet added can be kneaded strongly even if its temperature is increased, stable and good bread can be produced irrespective of the seasons. The area of the upper opening 54a is greater than the area of the lower opening 54b of the yeast container 54 and the inner wall surface of the yeast container 54 between the upper and lower openings 54a, 54b is smooth. Thus, the stored yeast can reliably be dropped from the yeast container 54 into the kneading container 43. As the upper opening 54a of the yeast container 54 opens at the upper surface of the lid assembly 50, yeast can be put into the yeast container 54 without opening the lid assembly 50. The inverted conical shape of the yeast container 54 allows the stored yeast to fall smoothly and reliably into the kneading container 43. The inner lid 51 on which the yeast container 54 is mounted is detachable, the yeast container 54, the lower opening 54b thereof, and the closure plate 56 with its associated members can be washed or otherwise serviced by detaching the inner lid 51 from the lid assembly 50.

The inner lid 51 to which the yeast container 54 is fixed is vertically slidably supported on the lid assembly 50 by the attachment screw 64 which serves as a guide for vertical movement of the inner lid 51. The lid assembly 50 and the yeast container 54 are held against with each other through the resilient member 66. Therefore, even if there are small dimensional variations, the inner lid 51 can be pressed against the baking container 34 to keep the latter completely sealed hermetically. Therefore, temperature control within the baking container 34 can stably be effected for making good-quality bread. The inner lid 51 can be detached from the lid assembly 50 simply by removing the attachment screw 64. The stopper 65 of the attachment screw 64 prevents the inner lid 51 from falling off or being lost. The conical tip 64d of the attachment screw 64 allows the latter to be easily threaded into the threaded hole in the lid assembly 50.

The closure plate 56 is integral with the shaft 57, which is rotated about its axis to tilt the closure plate 56 downwardly for thereby opening the lower opening 54b of the yeast container 54. Accordingly, the stored yeast can reliably dropped downwardly into the kneading container 43 without remaining on the closure plate 56. The bent end 57a of the shaft 57 is angularly moved by the actuator bar 58 driven by the drive unit 60, so that the force from the actuator bar 58 can reliably be transmitted to the closure plate 56 that can be operated without failure which may occur due to contamination by the yeast.

The non-sticky member 67 is interposed between the lower opening 54a of the yeast container 54 and the inner lid 51, and the lower surface of at least one of the closure plate 56 and the inner lid 51 is covered with a non-sticky material. Even when bread materials are deposited on the closure plate 56 during the bread making process or when the dough being excessively expanded touches the closure plate 56, any deposits on the closure plate 56 can easily be removed from the non-sticky material covering the closure plate 56. As a consequence, the closure plate 56 can reliably operated without fail for charing the stored yeast into the kneading container 43.

The pivoted portion of the actuator bar 58 which drives the closure plate 56 is angularly movably disposed in the lid assembly 50 and fitted substantially hermetically in the cylindrical boss 50c contiguous to the partition 50a integral with the lid assembly 50 and the cylindrical boss 68a on the lower lid cover 68 within the isolated chamber 50b which isolates the drive unit 60 from the yeast charger. Therefore, steam or hot air will not enter the drive unit 60 in the isolated chamber 50b, and the drive unit 60 is prevented from suffering rust, electric insulation failure, or other problems which would result from exposure to steam or hot air. The pivoted portion of the actuator bar 58 is also prevented from corrosion, so that it will operate reliably to cause the yeast to drop into the kneading container 43 without fail.

Figure 8:
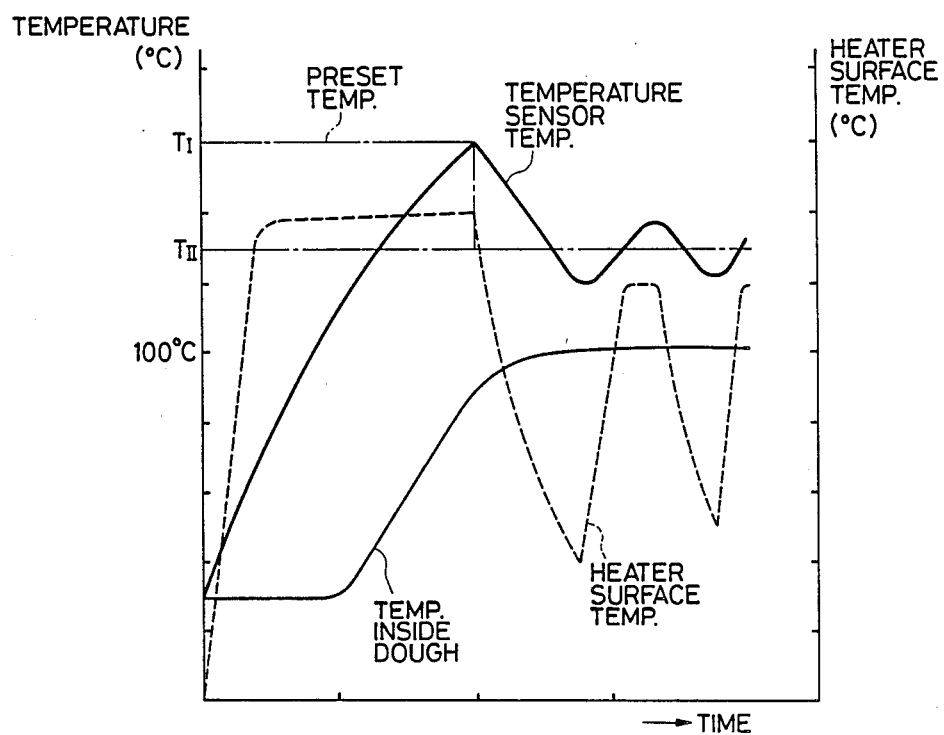
FIG. 8 is a graph showing temperatures in a baking step of the bread making method.
Figure 9:
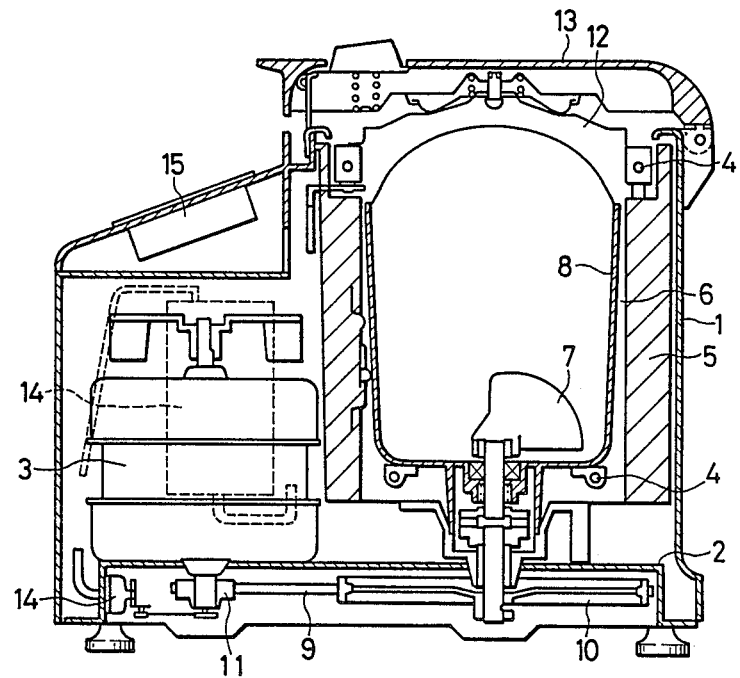
FIG. 9 is a vertical cross-sectional view of a conventional automatic bread making machine.

FIG. 8 shows various temperatures in the bread making apparatus during the bread baking stage. As is apparent from FIG. 8, it is not necessary to pre-heat the dough when the bread baking step is initiated. Assuming that the dough starts to be baked from the temperature at the dough-shaping fermentation, the heater 38 starts baking the dough with the full heater input current until the temperature reaches a preset maximum control temperature $T_I$ which is set by the temperature sensor 40. Until the temperature $T_I$ is reached, the top of the dough is baked to darker brownish color whereas the bottom and sides of the dough are baked to lighter brownish color. The baked bread is thus well balanced in color. The top of the baked bread is well shaped to give a good appearance to the bread. Until the temperature $T_I$ is reached, the inside of the dough gives off a powdery smell and is still raw since it is not yet sufficiently heated. After the temperature $T_I$ has been reached, the heater 38 is energized at a certain duty ratio to bake the dough up to a preset control temperature $T_{II}$ set by the temperature sensor 40, which is lower than the preset control temperature $T_I$. As a result, the dough is not strongly baked at this time and does not take on additional brownish color on its surface, so that the bread remains well balanced in color. The crust of the bread is not excessively thick, and the bread is well baked throughly inside thereof.

Even when a dough which has gone through the dough-shaping fermentation step started at room temperature without being pre-heated is placed for baking, the dough can be baked to well-balanced color and the baked bread has reduced baking irregularities through the combination of the higher-temperature baking mode in which the dough is subjected to heat radiation from the heater 38 energized by the full input current and an increase in the atmospheric temperature in the baking chamber 53, until the preset control temperature $T_I$ is reached, and the subsequent lower-temperature baking mode at the preset control temperature $T_{II}$. The above baking operation is also advantageous in that the bread making apparatus consumes a reduced amount of electricity and hence is economical.

Although a certain preferred embodiment of the present invention has been shown and described in detail, it should be understood that various changes and modifications may be made therein without departing from the scope of the appended claims.

What is claimed is:

1. A method of making bread, comprising the steps of:
   (a) kneading bread ingredients and an amount of water higher than normal into a first dough;
   (b) adding solely dry yeast to said first dough;
   (c) kneading said first dough and said dry yeast into a second dough;
   (d) fermenting said second dough;
   (e) releasing a gas from said second dough while the second dough is being fermented; and
   (f) baking said second dough after the second dough has been fermented.

2. A method according to claim 1, further including the step of resting said first dough between said kneading step (a) and said adding step (b).

3. A method according to claim 1, further including the step of pre-heating said first dough to a preset temperature between said kneading step (a) and said adding step (b) when the temperature of said first dough as detected a prescribed time period before said adding step (b) is below said preset temperature.

4. A method according to claim 1, wherein said kneading step (a) comprises the steps of first intermittently kneading said first dough for a prescribed period of time and then continuously kneading said first dough after said prescribed period of time.

5. A method according to claim 1, further including the step of releasing the gas from said second dough during said fermenting step (d).

6. A method according to claim 1, wherein the temperature of said first dough kneaded in said first kneading step (a) is detected, and when the detected temperature is higher than a preset temperature, the time of adding said dry yeast in said adding step (b) is delayed from the adding time which is the case when the detected temperature is lower than the preset temperature.

7. A method according to claim 1, wherein the proportion of water to the other bread ingredients in said kneading step (a) is about 75 percent by weight.

* * * * *

UNITED STATES PATENT AND TRADEMARK OFFICE
CERTIFICATE OF CORRECTION

PATENT NO. : 4,885,176

DATED : December 5, 1989

INVENTOR(S) : Hirofumi NAKAKURA et al

It is certified that error appears in the above-identified patent and that said Letters Patent is hereby corrected as shown below:

The face of the Patent, under "Foreign Application Priority Data",
  line 3, "61-305117" should be --61-300037--; and
  line 5, "61-300037" should be --61-305117--.

Signed and Sealed this

First Day of January, 1991

Attest:

HARRY F. MANBECK, JR.

*Attesting Officer*     *Commissioner of Patents and Trademarks*